Patented Apr. 13, 1937

2,076,781

UNITED STATES PATENT OFFICE 2,076,781

THERMOPLASTIC COMPOSITIONS AND METHOD OF PREPARING THE SAME

Henry Jacobsen (now by judicial decree to Henry Jenett), Englewood, N. J., assignor to Celanese Corporation of America, a corporation of Delaware No Drawing. Application May 18, 1933,
Serial No. 671,642

11 Claims. (Cl. 106—40)

This invention relates to the preparation of thermoplastic compositions comprising derivatives of cellulose and rubber in intimate admixture.

An object of my invention is to form compositions of matter that may be shaped under heat and pressure to any desired form, which compositions of matter comprise a derivative of cellulose compound in intimate admixture with rubber. A further object of my invention is to form such compositions of matter by simultaneously grinding and dispersing the derivative of cellulose and the rubber in a liquid medium that is a non-solvent or precipitant for the derivative of cellulose. Other objects of this invention will be described in detail.

Heretofore rubber and cellulose derivatives have been considered incompatible, since it is practically impossible to combine them by prior known methods even on a laboratory scale, due to the lack of suitable common solvents.

In my copending U. S. applications Serial No. 641,233 filed Nov. 4, 1932 and Serial No. 663,344 filed March 29, 1933, of which this application is in part a continuation, I have disclosed processes that are suitable for compounding thermoplastic materials from a chlorinated rubber base and I have also described, by way of example, a plastic mass containing such substituted compound of rubber.

I have found that if cellulose derivatives and rubber are simultaneously ground and dispersed in the presence of a liquid medium that has no solvent action on the cellulose derivatives, homogeneous and intimate mixtures are formed, which have the desirable physical and chemical properties of both the cellulose derivatives and the rubber. Plasticizers, resins, oils, pigments, dyes, filling materials and the like may be incorporated to impart any desired physical properties to such compositions.

Compositions formed by my invention have many desirable properties. The rubber content increases the chemical inertness of the cellulose derivatives; it improves the resiliency and flexibility of the product; it increases the softening point, as well as the melting point, of the composition; it makes the product more waterproof and more water-repellent; it lends to the compound greater adhesiveness to cloth, paper and similar bases. On the other hand, the cellulose derivatives, by surrounding the rubber with a fine protective coating, appear to make it more resistant to the oxidizing influence of the atmosphere; they remove the tackiness that is characteristic of unvulcanized rubber; they improve the flow of rubber compounds under heat and pressure and, in the case of very low melting rubbers, such as guttapercha or balata, they increase the softening and melting points very considerably.

Any suitable rubber may be employed in carrying out my invention. The term "rubber" as employed herein is not only intended to cover all kinds of natural rubber of the empirical formula $(C_{10}H_{16})X$ derived from the sap of such plants as Hevea, Ficus, Castilloa, Manihot, etc. as well as those of the Sapotazea and Minusops families known as guttapercha and balata respectively, but it is also intended to include synthetic substances of analogous compositions, such as polymerized hydrocarbons of the isoprene series, for instance.

The rubber may be incorporated with any suitable derivatives of cellulose such as cellulose nitrate or organic derivatives of cellulose. The organic derivatives may be organic esters of cellulose such as cellulose acetate, cellulose formate, cellulose propionate or cellulose butyrate, or cellulose ethers such as ethyl cellulose, methyl cellulose and benzyl cellulose. These cellulose derivatives may, prior to treatment, be in the form of flocks, grains, flakes, fibres, granules and the like.

While the rubber, with or without modifying agents, is preferably ground and dispersed in the liquid non-solvent medium simultaneously with the cellulose derivative, in some cases the rubber may be added after such cellulose derivative has been ground and dispersed in the non-solvent liquid.

In order to obtain the required grinding and dispersing, it is important to employ apparatus suitable for this purpose. This may be accomplished for instance by forcing a suspension of the cellulose derivative and rubber in water or other non-solvent liquid medium between two closely spaced abrasive surfaces, such surfaces being either moved rapidly in opposite directions, or one surface moving rapidly while the other is stationary, thus producing a great attrition effect.

A convenient apparatus for causing this grinding and dispersing is a colloid mill having two discs that have opposing abrasive surfaces. These discs may be rotated in opposite direction at relatively high speeds, or one disc may be maintained stationary while the other may be caused to rotate rapidly. At least the surfaces of such discs should be made of abrasive or hard, rough material, such as carborundum, sintered corundum, fritted glass, emery, or roughened steel or other hard metal. These discs may be made wholly of such abrasive material, or their opposing surfaces may be merely coated or lined with the same. A suitable apparatus that may be used is a colloid mill comprising a stationary disc of carborundum, through the center of which the suspension to be ground and dispersed is fed into the very narrow space between such stationary carborundum disc and an opposing carborundum disc rotating at say 2500 to 5000 R. P. M.

The use of discs of such abrasive surfaces in the colloid mill is of great importance, since if the ordinary discs of smooth, fluted or grooved metallic surfaces are employed, it is not possible to attain the best results because of lack of proper grinding action.

The use of a liquid dispersing medium such as water, for instance, which, being a non-solvent, or precipitant for the derivatives of cellulose, prevents the agglomeration or coalescence of the mechanically homogenized particles, keeps the compound in a form suitable for any kind of application, without further chemical or mechanical treatment, except that of preferably, but not necessarily, removing the liquid dispersing medium by evaporation or other known methods of dehydration.

Any desired modifying agent for the thermoplastic composition may be incorporated therewith. By "modifying agent" I mean any substance which is adapted to impart any desired properties such as softness, elasticity, flexibility, hardness, gloss, color, stability, etc. to the finished product. Such modifying agents may be plasticizers, dyes, pigments, lakes, filling materials, resins, oils, etc. Examples of plasticizers are camphor, dibutyl phthalate, diethyl phthalate, tricresyl phosphate, triphenyl phosphate, ethyl paratoluene sulfonamid, etc., the choice of plasticizer depending upon the properties of the thermoplastic compound employed as the base.

The amount of non-solvent liquid employed during the grinding and dispersing will vary in accordance with the nature of the ingredients and the purpose for which the product is intended, so that the product may have a consistency varying from a stiff paste to a freely flowing "slurry". In the case of the use of water as the non-solvent liquid, the amount employed may be from less than 5 to 12 or more volumes of water per volume of the solid ingredients employed.

The rubber may be introduced during or after the process of dispersing and grinding of the derivative of cellulose together with all the other desired ingredients. While I prefer to use a concentrated latex of approximately 50% to 60% rubber content, the use of dilute latex or other collodial solutions of rubber, or of dry rubber, such as can be commercially obtained in the form of crepe, sheet, block, or granule, for instance, will produce excellent results. In the case of a dry natural rubber or of a synthetic rubber, I prefer to reduce the material to a more or less fine grain, which will enable it to pass conveniently through the colloid mill. If desired, the natural or synthetic rubber may be added in the form of a solution in some organic solvent medium such as benzol, which is not a solvent of the particular cellulose derivative employed in the composition.

If desired, resins, such as shellac, or oils such as linseed oil, which heretofore have been considered to be incompatible with cellulose acetate or other organic derivatives of cellulose, may be incorporated with the cellulose acetate or other derivative of cellulose and the rubber to form a composition that is capable of producing upon the application of heat and pressure, products that are homogeneous.

The process and product of the present invention presents many distinct advantages over prior practice. The compositions formed by my invention have great adhesion to metal or other smooth surfaces. The simultaneous grinding and dispersing action of the closely spaced abrasive surfaces having a high rate of relative motion, causes fine and homogeneous distribution of the rubber as well as any special effect materials such as dyes, pigments and lakes that may be employed.

After the dispersing and grinding action, the derivative of cellulose and rubber are present in intimate and homogeneous admixture to form a perfectly homogeneous plastic compound in extremely finely divided form.

After the paste or slurry is formed by the combined dispersing and grinding action, this may be worked up into the desired product by several methods, examples of which will now be given.

In one mode of procedure, the slurry or paste containing the derivative of cellulose, rubber and water or other non-solvent liquid medium, is applied directly to the article or surface that is to be impregnated or covered with the thermoplastic compound. Thus for instance paper or fibre board may be covered with a layer of the plastic composition in slurry or paste form, the liquid dispersing medium, such as water, may be evaporated while the paper or fibre base passes through the drying machine in a paper mill, after which by the use of hot calenders or stacks the thermoplastic composition is fused, thus forming a water- or grease-proof coating, or imparting to the paper or board any other desired properties or finishes, according to the substances employed in making such slurry or paste.

While the use of such slurry or paste is of importance in connection with paper making, since it renders possible the conversion or coating of the paper as a part of the routine paper-making process, as against a distinct and separate operation heretofore applied to the finished paper, it is to be understood that such slurry or paste may be used for the production or coating of other materials such as artificial leather, floor covering or any other type of coated fabric, since such production can be simplified by the application of the slurry directly to the fabric base, giving in one operation a coating of any desired thickness, as the absence of volatile solvents for the derivatives of cellulose permits of the application of even a very heavy layer of the thermoplastic compound, such as would require from 3 to 10 or more coatings by the ordinary method of spreading or spraying solutions of cellulose derivative compositions.

A further important use of such "slurry" is for the treatment of fabrics, yarns or other textile products. Such a slurry, when made in a liquid medium that has a certain affinity for textile fibres, that is compatible with water-soluble sizes and that is not affected by the moisture content of the fabric, may be easily applied at the textile mill, either as a permanent sizing or as a finishing coat, thereby eliminating conversion steps in separate mills.

A second mode of employing the composition formed by the dispersion and grinding of the derivative of cellulose and rubber in the non-solvent medium, is particularly useful when metallic, glass or other nonporous surfaces are to be covered with a thermoplastic composition. Where, for instance, steel or other metal sheets or objects are to be covered or where, for instance, asbestos board is to be enameled to imitate glazed tile, or where leather is to be given a lacquered or so-called patent leather finish, or in other similar cases where the least traces of moisture would be objectionable, the dispersing medium of the slurry is first removed by any suitable method, such as spray-drying or drying in a vacuum. The fine powder resulting from the evaporation of the water or non-solvent medium is applied to the smooth surface of the metal, asbestos board, leather and the like and welded thereto by means of heat and pressure.

In the case where solid bodies are to be formed directly from the thermoplastic composition, either of the two methods above described may be employed, depending upon the product, the type of equipment available and other factors.

Thus, for instance, thin films or tissue-like transparent or opaque foil may be produced from a slurry on equipment and by means similar to those employed in the paper making industry, while bulky pieces such as molded insulation, novelties, etc., should preferably be made from the plastic composition in dry form, in order to save the time required to evaporate the dispersing medium from each individual article before curing or fusing the plastic composition. The product formed after removal of the water or other non-solvent liquid may be used as a molding powder in any suitable manner such as by heating the same until it is flowable and then extruding into a mold, or by placing the powder in a mold and then applying heat and pressure.

In order further to illustrate my invention, but without being limited thereto, the following specific examples are given merely by way of illustration and are in no way limitative.

*Example I*

The following is an example of a method of making a composition to be used for application to a fabric to form artificial leather.

|  | Parts by weight |
|---|---|
| Cellulose acetate | 100 |
| Triacetin | 60 |
| Ethyl paratoluene sulfonamid | 40 |
| Triphenyl phosphate | 30 |
| Latex (50% rubber content) | 60 |
| Chrome green | 80 | are suspended in 500 to 600 parts by weight of water. The suspension is fed to a colloid mill, where it is forced between two closely spaced carborundum discs, one of which is stationary and the other is rotating at a speed of about 3,600 R. P. M.

*Example II*

The following is an example of a method of making a molding composition suitable for insulators.

|  | Parts by weight |
|---|---|
| Cellulose acetate | 100 |
| Diethyl phthalate | 18 |
| Ethyl paratoluene sulfonamid | 12 |
| Triphenyl phosphate | 5 |
| Rubber (in solid grain form) | 25 |
| Powdered asbestos | 75 | are suspended in 500 parts by weight of water. This mixture is subjected to the dispersing and grinding action described in Example I. The resulting mass is then freed of water by evaporation in any suitable manner and the dry powder formed may be subjected to heat and pressure in any desired molding operation to form the desired articles.

It is to be understood that the foregoing detailed description is given merely by way of illustration and that many variations may be made therein without departing from the spirit of my invention.

Having described my invention, what I desire to secure by Letters Patent is:

1. In the manufacture of thermoplastic compositions, the step of dispersing and grinding rubber and a derivative of cellulose in solid form in a liquid medium which is a non-solvent for the derivative of cellulose and rubber.

2. In the manufacture of thermoplastic compositions, the step of dispering and grinding rubber latex, having a rubber content of from 50 to 60%, and a derivative of cellulose in solid form in a liquid medium which is a non-solvent for the derivative of cellulose and rubber.

3. In the manufacture of thermoplastic compositions, the step of dispersing and grinding rubber and cellulose acetate in solid form in a liquid medium which is a non-solvent for the cellulose acetate and rubber by passing the same between relatively moving closely spaced abrasive surfaces.

4. In the manufacture of thermoplastic compositions, the step of dispersing and grinding a derivative of cellulose in solid form, rubber and a modifying agent in a liquid medium which is a non-solvent for the rubber and derivative of cellulose by passing the same between relatively moving closely spaced abrasive surfaces.

5. In the manufacture of thermoplastic compositions, the step of dispersing and grinding cellulose acetate in solid form, rubber and a plasticizer for the cellulose acetate in a liquid medium which is a non-solvent both for the cellulose acetate and the rubber by passing the same between relatively moving closely spaced abrasive surfaces.

6. In the manufacture of thermoplastic compositions, the step of dispersing and grinding celluose acetate in solid form and rubber in water by passing the same between relatively moving closely spaced abrasive surfaces.

7. Process of producing a thermoplastic composition comprising dispersing and grinding a derivative of cellulose in solid form and rubber latex, having a rubber content of from 50 to 60%, in a volatile liquid medium that is a non-solvent for the derivative of cellulose and rubber, and then removing at least part of the volatile non-solvent liquid medium.

8. Process of producing a thermoplastic composition comprising dispersing and grinding rubber and a derivative of cellulose in solid form in a volatile liquid medium that is a non-solvent both for the derivative of cellulose and the rubber by passing the same between relatively moving closely spaced abrasive surfaces, and then removing at least part of the volatile non-solvent liquid medium.

9. Process of producing a thermoplastic composition comprising dispersing and grinding rubber latex, having a rubber content of from 50 to 60%, and a water-insoluble derivative of cellulose in solid form in water by passing the same between relatively moving closely spaced abrasive surfaces, and then removing at least part of the water.

10. The process comprising dispersing and grinding rubber and a derivative of cellulose in solid form in a volatile liquid medium that is a non-solvent for the derivative of cellulose and rubber, evaporating the liquid medium, applying the resulting product to a base and then applying heat and pressure.

11. The process comprising dispersing and grinding rubber and a water-insoluble derivative of cellulose in solid form in water by passing the same between relatively moving closely spaced abrasive surfaces, removing at least part of the water and subjecting the mass to pressure between heated surfaces.

HENRY JACOBSEN.